United States Patent Office 3,406,122
Patented Oct. 15, 1968

3,406,122
COATING COMPOSITION
Franklin L. Racine, Rochester, Mich., assignor to General Motors Corporation, Detroit, Mich., a corporation of Delaware
No Drawing. Filed Jan. 28, 1966, Ser. No. 523,567
4 Claims. (Cl. 252—408)

This invention relates to stress analysis and more particularly to improved brittle resin coatings for use in stress analysis.

It has long been known that a brittle coating on a strained metal part furnishes an excellent means of recognizing overloaded regions. A suitable brittle coating is one which will fracture in response to strain in the metal structure beneath it. The brittle coating cracks and flakes in an irregular pattern when the metal beneath yields.

To indicate the direction of strain, the brittle coating requires the additional property that it will adhere to the surface of the structure while it fractures within itself. Quantitative measurements require also that the coating be uniformly brittle over the entire surface of the structure. Moreover, for practical use the coating must be uniformly brittle over a substantial range of thicknesses since uniform coating thicknesses are difficult to achieve in practice. It must be substantially non-responsive to humidity conditions over a substantial humidity range which corresponds to normal humidity conditions, and substantially non-responsive to a substantial temperature range corresponding to normal indoor temperature conditions.

In general, the strain analysis technique involved in this invention consists in coating the test part with a suitable lacquer which as above indicated becomes brittle when it dries and hardens and adheres to the test part. When the part is loaded and a strain is applied, the brittle coating cracks and the patterns produced give the location and direction of strain. Correlation between the test part and the strain level can be obtained by the use of a test or calibration bar having the same coating as the test part. By careful analysis of the cracked pattern on the test part and the calibration bar, quantitative values of strain can be predicted. In general practice the brittle lacquer is used as a qualitative tool. After the cracked patterns have been located on the test part, strain gages are applied to the part and the magnitude of strain can be determined.

In the past, efforts have been made to use various materials such as varnish, lacquer, and resins for the brittle coatings. A basic disadvantage in the prior art coatings was in the presence of solvents which produced severe fire hazards. Another disadvantage was in the toxicity of the solvent. For these reasons it was necessary to equip laboratories with costly features to provide maximum safety and efficiency in the use of the brittle lacquer technique, and some test laboratories refused to use the technique because of its hazardous nature.

It is the basic object of this invention to provide an improved resinous composition capable of drying by evaporation and hardening to form a uniformly brittle film responsive to strains by cracking and adapted for use in observing the surface strain concontration in a rigid article at a temperature within the range of about 60° to 90° F. under various humidity conditions ranging from about 10% to about 70% relative humidity, which substantially eliminates the fire hazard and greatly reduces toxicity.

These and other objects are accomplished by the provision of a composition consisting essentially of zinc abietate, calcium abietate, oleic acid, and dibutyl phthalate in a methylene chloride solvent solution in certain critical proportions. Besides eliminating the fire hazard and reducing toxicity, the composition provides a brittle coating which adheres satisfactorily to the test part, has improved sensitivity in its response to strain over the known compositions of the prior art, and is less responsive to humidity changes and temperature changes within normal operational limits.

In general, suitable brittle coatings may be formed which are operative in the temperature range of about 60° to 90° F. under humidity conditions ranging from about 10% to 70% relative humidity having the following composition:

| | | |
|---|---|---|
| Zinc abietate | grams__ | 100 to 1000 |
| Calcium abietate | do____ | 50 to 250 |
| Dibutyl phthalate | ml__ | 10 to 100 |
| Oleic acid | ml__ | 10 to 100 | and sufficient methylene chloride to make one gallon of coating solution.

In the above formulation and those to follow, the volumetric measurements were made at about 75° F.

The calcium and zinc abietate form the basic resin components and both are required to obtain the desired sensitivity. The dibutyl phthalate functions essentially as a plasticizer. The oleic acid serves both as a plasticizer and a drying agent whereby the resinates are caused to set up more rapidly. The calcium abietate also helps to overcome humidity interference. However, a proper relationship between the oleic acid and the dibutyl phthalate is also operative to overcome humidity interference. The term "humidity interference" as used herein refers to the fact that in the presence of excessive humidity, the brittle coating does not crack properly. In other words, under interference conditions a crazed form of cracking is obtained which does not properly indicate the direction of stress.

In general, when the desired proportions of constituents is established, the ratio of zinc abietate to calcium abietate may be held constant and the sensitivity of the system due to the changes in humidity may be controlled or varied by adjusting only the oleic acid content of the system. Thus, in general, the proportion of oleic acid in the above formulation is increased for lower humidities and, conversely, decreased for higher humidities. The ratio of zinc abietate to calcium abietate may, however, be varied in accordance with the above formula to provide operative brittle coatings with acceptable sensitivity and humidity and temperature stability.

The preferred composition for normal humidities in the range of about 10% to 70% relative humidity and a temperature range of about 60° to 90° F. is as follows:

| | | |
|---|---|---|
| Zinc abietate | grams__ | 500 to 700 |
| Calcium abietate | do____ | 75 to 125 |
| Dibutyl phthalate | ml__ | 25 to 35 |
| Oleic acid | ml__ | 25 to 75 | and sufficient methylene chloride to make one gallon of solution.

Example I

A specific composition which may be used effectively for relatively low relative humidities of about 10% to 40% is as follows:

| | | |
|---|---|---|
| Zinc abietate | grams__ | 600 |
| Calcium abietate | do____ | 100 |
| Dibutyl phthalate | ml__ | 30 |
| Oleic acid | ml__ | 50 | and sufficient methylene chloride to make one gallon of solution.

Example II

A specific example of a composition for use involving relatively high humidities of about 40% to 70% is as follows:

| | | |
|---|---|---|
| Zinc abietate | grams | 600 |
| Calcium abietate | do | 100 |
| Dibutyl phthalate | ml | 30 |
| Oleic acid | ml | 40 | and sufficient methylene chloride to make one gallon of solution.

It is noted that in the specific Examples I and II above, the zinc abietate and the calcium abietate, as well as the dibutyl phthalate, is held constant while the oleic acid content is relatively higher for lower humidity ranges.

Example III

The following coating composition has been found to have the least interference from humidity and temperature difference, particularly under average humidity conditions of about 20% to 40% relative humidity:

| | | |
|---|---|---|
| Zinc abietate | grams | 600 |
| Calcium abietate | do | 100 |
| Dibutyl phthalate | ml | 30 |
| Oleic acid | ml | 58 | and sufficient methylene chloride to make one gallon of solution.

The compositions indicated in the above formulations are prepared as follows: First, the calcium and zinc abietates are weighed up in the desired proportions and mixed in a suitable container. Then sufficient methylene chloride is added to dissolve the abietates. The resinate mixture is heated in the solvent to a temperature of about 200° F. whereby the resinates are dissolved and subsequently all of the solvent is driven off along with the other volatiles that may be present to produce a fused mass which now may be readily redissolved in methylene chloride. In general, about two parts of methylene chloride per five gallons of the abietates may be used in preparing suitably fused abietates. Thereafter, the dibutyl phthalate plasticizer and oleic acid are mixed with the dissolved abietates to form the coating composition of this invention. It has been found that first fusing the abietate constituents as above indicated is essential since otherwise a coating will result which produces heterogeneous cracking which is generally unsatisfactory. However, with the above mixing technique, sharp clean cracks are obtained as is required.

For successful application of the coating of this invention, it is preferred to apply the coating to the test part by spraying while maintaining temperature and himidity conditions within the limits specified for the composition. In general, the method consists of first preparing the surface of the test part by providing it with a clean and dry surface. The clean and dry surface may be provided by merely cleaning it thoroughly with a suitable solvent to remove all foreign matter. The type of solvent used will of course depend on the nature of the surface contaminant. Preferably, an undercoating is provided on the test piece to provide for a suitable clean and dry surface. A suitable undercoating material is the Du Pont black lacquer #253–2247 using the Du Pont 3601 thinner. In some instances, an aluminum lacquer is applied when it is desired to use a bright undercoating. When the lacquer is used, it must be allowed to dry at least thirty minutes, but not more than four hours since the excessive drying will make the lacquer too sensitive.

After the surface has been prepared, the coating composition of this invention is applied, using a gravity feed, air-powered spray gun. Desirably, a coating is formed having a thickness of 0.005 to 0.010 inch which is smooth, shiny, and olive green in color. Best results are obtained when the coating thickness is about 0.008 inch. Unless the spraying is carefully performed, blistering or fogging of the coating is apt to occur. Blotchy areas caused by blisters may be the result of excessively low air pressure, an excessively fast solution flow, an excessively slow spray gun motion, or an excessively concentrated coating composition for the temperatures employed. Conversely, excessively high air pressure, slow solution flow, or fast gun motion may cause excessive fogging. Both of these excessive conditions result in coatings which are ineffective for strain analysis.

Although the invention has been described in terms of certain specific embodiments, it is to be understood that the invention is not limited thereby except by the following claims.

I claim:

1. A liquid composition capable of drying by evaporation to form a uniformly brittle film responsive to strains by cracking and adapted for use in observing the surface strain concentration in a rigid article at a temperature within the range of about 60° to 90° F. and a humidity range of about 10% to 70% relative humidity, said composition consisting essentially of about 100 to 1000 grams zinc abietate, about 50 to 250 grams calcium abietate, about 10 to 100 milliliters of dibutyl phthalate measured at about 75° F., about 10 to 100 milliliters of oleic acid measured at about 75° F., and sufficient methylene chloride to make one gallon of solution.

2. The composition of claim 1 in which said zinc abietate content is 500 to 700 grams, said calcium abietate content is 75 to 125 grams, said dibutyl phthalate content is 25 to 35 milliliters, and said oleic acid content is 25 to 75 milliliters.

3. The composition of claim 1 in which said zinc abietate content is about 600 grams, said calcium abietate content is about 100 grams, said dibutyl phthalate content is about 30 milliliters, and said oleic acid content is about 58 milliliters.

4. The composition of claim 1 in which said composition is formed by first dissolving said zinc abietate and calcium abietate in methylene chloride, the methylene chloride is then evaporated and the zinc abietate and calcium abietate are redissolved in methylene chloride and admixed with the oleic acid and dibutyl phthalate.

References Cited

UNITED STATES PATENTS

| 2,294,897 | 9/1942 | Ellis | 252—408 XR |
|---|---|---|---|
| 2,676,487 | 4/1954 | Clarke | 252—408 XR |

MAYER WEINBLATT, *Primary Examiner.*